3,414,627
PROCESS FOR THE PREPARATION OF
VINYL FLUORIDE
Dario Sianesi, Milan, Renzo Fontanelli, Rome, and
Giuseppe Nelli, Milan, Italy, assignors to Montecatini Edison S.p.A., Milan, Italy
No Drawing. Filed Nov. 19, 1964, Ser. No. 412,315
Claims priority, application Italy, Nov. 22, 1963,
23,869/63
5 Claims. (Cl. 260—653.4)

ABSTRACT OF THE DISCLOSURE

Process for preparing vinyl fluoride which comprises introducing a flow of gaseous vinyl chloride into a liquid acid phase containing hydrogen fluoride and passing the reaction products into a pyrolysis chamber at a temperature from 400 to 800° C. at about atmospheric pressure.

---

Our invention has as an object a new process for the synthesis of vinyl fluoride. More particularly, according to our invention, the vinyl fluoride is continuously obtained by reacting vinyl chloride and hydrogen fluoride.

Vinyl fluoride is a compound of particular importance because by polymerization and copolymerization with other monomers, plastic materials of great interest (see for instance G. H. Kalb et al., J. Appl. Polymer Sci., 4, No. 10, 55–61, 1960) can be obtained.

The synthesis of vinyl fluoride has long been the object of numerous researches. Most processes known up to now are based on the reaction between acetylene and hydrogen fluoride. This reaction, which schematically is completely similar to those reactions successfully utilized for the preparation of other vinyl halides and of vinylic compounds in general, is normally carried out in the vapor phase and requires the use of appropriate catalysts. This reaction leads chiefly to the formation of a mixture of vinyl fluoride and asymmetric difluoroethane together with unconverted acetylene and hydrogen fluoride. The difluoroethane can in turn be converted in a separate stage into vinyl fluoride by means of pyrolysis at very high temperatures. The processes based on the reaction between acetylene and hydrogen fluoride in the presence of various kinds of solid or liquid catalysts, however, invariably exhibit some remarkable inconveniences that limit the possibilities of utilizing them.

In the first place, the rapid inactivation of the catalysts results in a continuous increase in the acetylene conversion time and to a continuous variation in the ratio among the main reaction products, vinyl fluoride and difluoroethane. The inactivation of the catalyst makes frequent substitution necessary or, if possible, reactivation of the catalyst. This is a time-consuming and difficult procedure.

Furthermore, the vinyl fluoride thus obtained has to be separated from the unreacted acetylene, since even very small quantities of acetylene in the vinyl fluoride cause a considerable deterioration in its polymerizability and in the quality of the polymers obtained. This separation, with recovery of the unconverted acetylene which is to be recycled into the reaction, is particularly cumbersome. Separation by fractional distillation is very difficult because of the nearness of the vapor pressure curves of the two products. This separation is also dangerous, since it requires handling liquid acetylene.

Because of these difficulties, azeotropic distillation (W. A. McMillan, J. Amer. Chem. Soc. 58, 1345, 1936), selective extractions with various solvents, (see Belgian Patent No. 626,014) or removal of the acetylene from the mixture by means of selective chemical reactions, as for instance the catalytic reaction with hydrogen chloride under formation of vinyl chloride which can more easily be separated from vinyl fluoride (Belgian Patent No. 617,631 and German Patent No. 1,134,664), have been attempted. These processes are very cumbersome and lead to a great economical burden on the vinyl fluoride thus produced.

Because of all these inconveniences, other processes for the synthesis of vinyl fluoride have been considered. Since vinyl chloride is comparatively inexpensive, the conversion thereof to vinyl fluoride has been of great interest. However, it was soon realized that a direct exchange of chlorine with fluorine in the vinyl chloride, also by means of various highly active fluorinating agents, cannot be conveniently adhered (A. E. Newkirk, J. Amer. Chem. Soc., 68, 2467–71, 1946).

More recent researches concerning the fluorination of vinyl chloride with hydrogen fluoride in the vapor phase at high temperatures and in the presence of appropriate catalysts have led to rather small vinyl fluoride conversions, with contemporaneous formation of various by-products and making necessary continuous reactivations of the catalysts (British Patent No. 921,254 and Belgian Patent No. 613,583). According to German Patent No. 859,887, vinyl fluoride is obtained from vinylchloride in two distinct separate stages, the first consisting in adding hydrogen fluoride to vinyl chloride under formation of 1-chloro-1-fluoroethane, by heating of the two reactants in the liquid phase to 10–15 atm., and the second consisting in the pyrolysis of chlorofluoroethane under atmospheric pressure at very high temperatures. This process gives very low total yields of vinyl fluoride, as considerable losses of vinyl chloride occur in the first reaction because of the formation of large quantities of polymeric by-products and because the chlorofluoroethane partly dehydrofluorinates in the pyrolysis thus carried out, reforming vinyl chloride, and partly decomposes in low-boiling products and carbon. Furthermore, said process evidently cannot be carried out continuously, as would be desirable.

Summing up, up to now no process was known that allowed to carry out the synthesis of vinyl fluoride in one step and continuously by means of the exchange reaction:

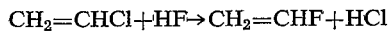

$$CH_2=CHCl + HF \rightarrow CH_2=CHF + HCl$$

with high transformation yields, whether with respect to vinyl chloride or with respect to hydrogen fluoride.

U.S. patent application Ser. No. 371,833 of June 1, 1964 describes a synthesis process of 1-chloro-1-fluoroethane and of 1,1-difluoroethane, by reaction between vinyl chloride and liquid anhydrous hydrogen fluoride, under atmospheric pressure and at room temperature or at temperatures below room temperature, preferably in the presence of certain acidic catalysts. U.S. patent application Ser. No. 286,524 filed June 10, 1963, now Patent No. 3,200,160, describes a synthesis for vinyl fluoride by pyrolysis of 1-chloro-1-fluoroethane at high temperature and under a pressure lower than atmospheric. In this process, operating at reduced pressure allowed to obtain excellent vinyl fluoride yields.

Both these latter processes gave satisfactory results; however, it was still desirable to operate in a fully continuous way, and achieve a direct synthesis of vinyl fluoride, from hydrogen fluoride and vinyl chloride, without having to isolate and purify any intermediate products.

We have found that we can obtain good vinyl fluoride conversions by heating at high temperatures and under atmospheric or slightly lower pressures, under the conditions established hereinbelow, gaseous mixtures substantially consisting of hydrogen fluoride, vinyl chloride, 1-chloro-1-fluoroethane, and optionally 1,1-difluoroethane and hydrogen chloride. The composition of these gaseous mixtures can vary within wide limits. The partial pressure of 1-chloro-1-fluoroethane therein is generally less than 0.5 atm. Gaseous mixtures of this composition are obtained for instance, according to the application Ser. No. 371,833, by bubbling, at room temperature or at temperatures lower than room temperature, gaseous vinyl chloride in liquid anhydrous hydrogen fluoride in the optional presence of an acidic catalyst agent.

We have also found that we can combine conveniently the reaction between vinyl chloride and liquid hydrogen fluoride with the pyrolytic reaction or reactions of the gaseous products of the preceding reaction, so as to obtain vinyl fluoride and hydrogen chloride as practically the only final products, consuming a corresponding amount of vinyl chloride and hydrogen fluoride.

We are therefore able to realize a new continuous process for the direct preparation of vinyl fluoride starting from vinyl chloride and hydrogen fluoride, and achieve continuously and with high yields, the reaction:

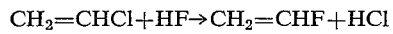

$$CH_2=CHCl+HF \rightarrow CH_2=CHF+HCl$$

One of the objects of our invention is the preparation of vinyl fluoride wherein a gaseous mixture ($\alpha$), consisting of hydrogen fluoride, vinyl chloride, 1-chloro-1-fluoroethane and optionally 1,1-difluoroethane and hydrogen chloride; containing per 100 parts of vinyl chloride, from 5 to 500 parts of 1-chloro-1-fluoroethane, from 20 to 1000 parts of HF, from 0 to 300 parts of HCl and from 0 to 300 parts of difluoroethane; is heated to a temperature higher than 400° C., preferably from 400 to 800° C., under approximately atmospheric pressure. All parts are by volume.

A preferred embodiment of our invention is carried out for instance as follows.

A flow of gaseous vinyl chloride is fed to a first reactor (A) containing a liquid phase substantially consisting of anhydrous hydrogen fluoride. The vinyl chloride is brought into intimate contact with a liquid acid phase, which is maintained at about atmospheric pressure and at approximately room temperature or at lower temperature. A gaseous flow consisting of hydrogen fluoride, vinyl chloride, 1-chloro-1-fluoroethane, 1,1-difluoroethane and hydrogen chloride is continuously removed from this reactor, wherein chiefly addition and substitution reactions take place. This gaseous mixture is directly fed to a second reactor (B), being for instance pipe-shaped, heated to a temperature comprised between 400 and 800° C. Several reactions, possibly pyrolysis or substitution reactions, take place in reactor (B), and result in the presence of considerable amounts of vinyl fluoride and hydrogen chloride in the gases leaving the reactor. After this second reaction, the gases are introduced into a distillation column preferably at about atmospheric pressure and at low temperature, or also under pressure and at room temperature. Vinyl fluoride and the hydrogen chloride are continuously separated in the distillation column from the other components of the mixture, i.e. hydrogen fluoride, vinyl chloride, chlorofluoroethane, difluoroethane, which are recycled into reactor (A) into which (or in other points of the system) fresh hydrogen fluoride is continuously or periodically introduced to replenish that consumed in the reaction.

It is preferred, although not necessary, that the liquid hydrogen fluoride, into which the gaseous flow of vinyl chloride is fed, also contains one or more other compounds of acidic nature, e.g. sulphuric acid, oleum, sulphuric anhydride, fluorosulphonic acid, alkaline bisulphates, perchloric acid, etc. These compounds have a certain catalytic action on the transformation of vinylchloride into chlorofluoroethane and into asymmetric difluoroethane under the moderate conditions of temperature and pressure adopted. The acidic catalytic agent may, for instance, be present in amounts comprised between 1 and 100 parts by weight per 100 parts of hydrogen fluoride. The amount of water present in the system is, however, preferably maintained very low, for instance less than 5% by weight on the total acidic liquid phase.

The first reactor (A) is made of inert material for instance iron, steel, monel, nickel, etc. resistant to the attack of the acidic reactants.

Into this reactor, a certain amount of liquid anhydrous hydrogen fluoride or of a mixture of hydrogen fluoride and the selected acidic catalytic agent is initially introduced. Into the liquid phase, at a temperature comprised between $-15$ and $+30°$ C., preferably between 0 and 15° C. a flow of gaseous vinyl chloride, for instance is introduced through an immersed tube reaching the bottom of the reactor. When a certain amount of vinyl chloride is dissolved in the acid medium, the continuous feeding of vinyl chloride causes the contemporaneous outflow from the reactor to a gaseous flow consisting of vinyl chloride; 1-chloro-1-fluoroethane; 1,1-difluoroethane; hydrogen chloride and hydrogen fluoride.

The ratios among the amounts of the various components of this mixture, that have previously been indicated, normally depend upon the ratio between the volume of the liquid acidic mixture present in the reactor and the volume of vinyl chloride fed per time unit. Furthermore, these ratios depend upon the operating temperature, upon the pressure, upon the concentration and the nature of the acidic catalytic agent dissolved in the hydrogen fluoride. The hydrogen fluoride accompanies these gases in amounts varying with the reaction temperature and with the amount and the type of acidic catalytic agent present, which, normally being miscible with hydrogen fluoride, may considerably reduce its vapor pressure.

Under the reaction conditions, the hydrogen fluoride is generally present in amounts varying between 20 and 1000 volumes per 100 volumes of organic product in the gases flowing out of the reactor.

Preferred reaction conditions are reaction temperatures comprised between 0 and 15° C.; a liquid acidic mixture consisting of 70–90 parts by weight of hydrogen fluoride and 30–10 parts by weight of 98%-$H_2SO_4$ or of oleum containing 20% of free $SO_3$; and a vinyl chloride introduction rate of between 5 and 100 N-litres per hour and per liter of total acidic mixture.

In the gas leaving reactor (A) from 0.1 to 5 volumes of hydrogen fluoride per 1 volume of organic product are present. This latter product normally contains from 20 to 70% by volume of 1-chloro-1-fluoroethane, from 1 to 20% by volume of 1,1-difluoroethane, the balance consisting of vinyl chloride.

According to a preferred embodiment of our invention, the gases leaving reactor (A) are directly fed to reactor (B) wherein the pyrolysis takes place and wherein the various elimination or substitution reactions take place leading to the formation of hydrogen chloride and of vinyl fluoride.

The amount of gaseous organic products fed to the pyrolysis and leaving reactor (A) does not necessarily correspond to the amount of fresh vinyl chloride fed to the acidic liquid phase. As a matter of fact, it is possible, and sometimes preferable, to increase the amount of products sent to the pyrolysis, while maintaining reactor (A) at a slight boiling. In this case the amount of gaseous products sent to the subsequent pyrolysis stage is determined by the amount of fresh vinyl chloride fed to the reactor and by the amount of heat continuously furnished to said reactor (A). Under the working conditions, the amount of fresh vinyl chloride fed to reactor (A) is preferably regulated so as to correspond to the amount of vinyl fluoride produced. Hydrogen fluoride, coresponding to that which reacted in the formation of vinyl fluoride, may also be fed continuously to the reactor or may be introduced batchwise so as to compensate the excess of hydrogen fluoride present in the reactor.

The pyrolysis reactor (B) wherein, at high temperatures, take place the reactions leading to the formation of vinyl fluoride and hydrogen chloride, is preferably pipe-shaped and made of inert material such as for instance iron, stainless steel, Monel, nickel, carbon, silver, platinum, etc. Said reactor is heated, for instance by means of outer electric heaters resistance so as to heat the gaseous flow that passes through it to a temperature comprised between 400 and 800° C., and preferably between 500° C and 700° C. The pyrolysis reactor itself may be provided with appropriate devices for preheating the gases or, anyhow, for obtaining a distribution of the temperature of the gases in the reactor, whether in longitudinal or in transversal direction, as uniform as possible.

The free volume of the pyrolysis reactor is generally such that the residence time of the gases flowing through it, under the effective conditions of temperature and pressure, is between 1 and 50 seconds and preferably between 2 and 30 seconds. (The preferred residence time is that which causes the highest concentration of vinyl fluoride and hydrogen chloride in the gases leaving the pyrolysis reactor, without any formation of by-products due to secondary reactions. The preferable residence time should be selected taking into account the composition of the gases entering the pyrolysis reactor and the temperature reached by the gases in said reactor.) We have found that the free reactor volume, heated to the effective reaction temperature, may be between 0.1 and 0.01 liters per N liter/hour of vinyl fluoride produced under the cited conditions.

Under the reaction conditions of the present invention, the vinyl fluoride content of the gases leaving the working reactor is not less than 5% by volume on the total amount of organic products present. Under the preferred conditions, said content is not less than 10% by volume.

The gases leaving the pyrolysis reactor, preferably after pre-cooling, are sent into a continuous distillation column. In the distillation column, vinyl fluoride (B.P. −72° C.) and hydrogen chloride (B.P. −83.7° C.), are separated from hydrogen fluoride (B.P. +19° C.), vinyl chloride (B.P. −13.5° C.), 1,1-difluoroethane (B.P. −24° C.) and 1-chloro-1-fluoroethane (B.P. +16.5° C.), which are then recycled into the reactor wherein the reaction between liquid hydrogen fluoride and vinyl chloride takes place. This distillation column may work for instance at approximately atmospheric pressure at low temperature.

From the top of the distillation column, a continuous gaseous flow practically consisting of only vinyl fluoride and hydrogen chloride in equal molar ratios is obtained. The hydrogen chloride can easily be removed, for instance by absorbing in water or in alkaline solutions so as to obtain considerably pure vinyl fluoride.

The process object of the present invention can also be carried out modifying the details of the above-described cycle, without departing from the spirit of this invention. The following examples of carrying out the present invention are only illustrative and are not to limit the scope thereof.

Example 1

An apparatus consisting of an iron cylindrical boiler having an inner diameter of 15 cm. and a total capacity of 3.5 liters, provided with an outer mantle, a level gauge, a thermometer sheath, a gas inlet tube immersed until 1 cm. from the bottom, a gas outlet tube and an immersed tube for returning the liquid products coming from the outlet of the distillation column is used. The gases leaving the reactor are preheated to 100° C. and their amount is controlled by means of a flowmeter, before entering into the pyrolysis reactor. The pyrolysis reactor consists of two coaxial iron tubes, the inner one having an inner diameter of 27.5 mm. and an outer diameter of 33 mm., the outer one having an inner diameter of 68.5 mm. The total length of this reactor, heated by an outer tube-shaped furnace, is 1200 mm. The pyrolysis reactor is built so as to allow the entering gases to be preheated in the inner tube and to pass then in opposite direction through the space comprised between the two tubes, where they react at the effective reaction temperature.

The temperature of the gases in the interior of the reaction space is measured by means of conveniently arranged thermocouples. When leaving the pyrolysis reactor, the gases are pre-cooled by means of a running-water cooler and are then fed to a distillation column made of iron, externally isolated, having a diameter of 55 mm. and contains, by a total height of 1000 mm., a filling consisting of stainless steel net rolls. The gases enter into the column at a point at 300 mm. from the bottom. The cooler of the column, acting as partial condenser, consists of a bundle of tubes immersed in a cooling solution maintained at −78° C. The bottom of the distillation column is directly connected, by means of an immersed tube, acting as a hydraulic guide and having a total height of 1500 mm., with the boiler in which the reaction between vinyl chloride and liquid hydrogen fluoride takes place. When leaving the distillation column and after washing with water and with a 10% NaOH solution and drying by means of a tower containing granular $CaCl_2$, the non-condensed gases are sucked in by a compressor which suction is regulated so that, when entering the pyrolysis reactor, the pressure of the gases is atmospheric or slightly lower. The gases are compressed at an absolute pressure of 1.5 atm. and condensed in a cylinder cooled to a temperature of −78° C.

To carry out the reaction 1.8 kg. of anyhdrous liquid hydrogen fluoride and 0.2 kg. of oleum containing 20% of free $SO_3$ were introduced into the reaction boiler, at a temperature of 15° C. Always at the same temperature, maintaining the pyrolysis reactor at a temperature lower than 400° C. and cooling the condenser of the distillation column to −78° C., the feeding of gaseous vinyl chloride to the reaction boiler through the immersed tube is begun, feeding 200 N liters in a period of about an hour. During this operation a considerable reflux from the distillation column was observed, while the temperature of the liquid phase in the boiler settled to at about 6–7° C. In the outer mantle of the boiler, a circulation of water of 15° C. was continuously maintained. The temperature in the pyrolysis reactor was then brought to 600° C. and, continuing the feeding of vinyl chloride to the boiler at a rate of 50 N liters/hour, the outflow of hydrogen chloride and vinyl fluoride from the distillation column starts. After operating for about 2 hours, working conditions are reached and from the top of the distillation column volumes of hydrogen chloride and vinyl fluoride corresponding practically to the volume of vinyl chloride fed at the same time were continuously removed.

These working conditions, i.e. temperature of the boiler 6–7° C., temperature of the gases in pyrolysis 600±10° C,. feeding of 45–50 N liters/hour of vinyl chloride, were maintained for a total period of 82 hours. During this period, liquid hydrogen fluoride is introduced into the boiler each hour, so as to maintain the liquid contained therein at a practically constant level. The vinyl fluoride obtained in the liquid state, under a pressure of 1.5 atm. at a temperature of −78° C., during the entire period, amounted to 7.6 kg.

The analysis of the product, indicated a titre higher than 98% and the complete absence of acetylene. The total amount of hydrogen chloride produced in the same period and absorbed in water and alkaline solution, amounted to 6.1 kg. In the washing waters, negligible quantities of hydrofluoric acid were noticed.

On the whole, the total yield of vinyl fluoride obtained, during this period, in the condensed state, with respect to the vinyl chloride used, was higher than 85%.

On calculating this yield, the vinyl chloride and its transformation products still contained in the apparatus are not taken into account.

Example 2

A test completely similar to the preceding one was carried out except that 1.7 kg. of anyhdrous hydrogen fluoride and 0.3 kg. of 98%-sulfuric acid were initially introduced into the boiler. After having fed about 200 N liters of vinyl chloride, working conditions are reached in about 2 hours, by which conditions the temperature in the boiler settled to 9–10° C., while a continuous passage of water of 15° C. in the outer mantel occurred, the temperature of the gases in the pyrolysis reactor was maintained at about 580±10° C., the pressure of the gases when entering in pyrolysis was 740±5 mm. Hg, the flow of vinyl fluoride from the top of the distillation column remains of about 35–38 N liters/hours of product having a titre higher than 98%, while 38–40 N liters/hour of vinylchloride were fed to the boiler and 35 g. of anhydrous hydrogen fluoride were introduced into the system each hour.

These reaction conditions were maintained practically unvaried for a period of 75 hours. At the end of this period, 0.75 kg. of liquid acidic mixture were removed from the boiler and an equal amount of a fresh mixture consisting of 85% by weight of hydrogen fluoride and 15% by weight of 98%-$H_2SO_4$ were introduced. After this operation, the working was started again and after a period of about 20 minutes working conditions completely analogous to the preceding ones are reached. These conditions are maintained for a further period of 75 hours. At the end of these periods the total yields of condensed vinyl fluoride, having a titre of 98%, was 81% with respect to the vinyl chloride fed and still partly contained in the apparatus.

Acetylene was completely absent in the vinyl fluoride obtained.

Example 3

A test is carried out similar to that described in Example 1, except that into reactor (A) 2 kg. of HF at a temperature of 12° C. were initially introduced. The feeding of vinyl chloride was then started at a rate of 30 N liters/hour. After about 4 hours, the temperature of the reactor settled to at about 3–5° C., while water was circulated through the outer mantle. The pyrolysis reactor was then brought to a temperature of about 600° C. and at the top of the distillation column, cooled to −78° C., the outflow of the equimolar mixture of HCl and $CH_2CHF$ started. After further 3 hours, the working conditions are reached characterized by:

(a) introduction of vinyl chloride=30 N liters/hour
(b) temperature of the liquid phase in reactor (A) =3–5° C.
(c) temperature of the pyrolysis reactor (B)=about 600° C.
(d) vinyl fluoride production=30 N liters/hour.

We claim:
1. A process for the preparation of vinyl fluoride which comprises heating a gaseous mixture consisting of hydrogen fluoride, vinyl chloride, 1-chloro-1-fluoroethane, 1,1-difluoroethane and hydrogen chloride, containing per 100 parts by volume of vinyl chloride, from 5 to 500 parts by volume of 1-chloro-1-fluoroethane, from 20 to 1000 parts by volume of HF, from 0 to 300 parts by volume of HCl, and from 0 to 300 parts by volume of 1,1-di-fluoroethane, to a temperature from 400° C. to 800° C., under approximately atmospheric pressure.

2. A process for the preparation of vinyl fluoride which comprises heating a gaseous mixture consisting of hydrogen fluoride, vinyl chloride, 1-chloro-1-fluoroethane, 1,1-difluoroethane and hydrogen chloride, containing per 100 parts by volume of vinyl chloride, from 5 to 500 parts by volume of 1-chloro-1-fluoroethane, from 20 to 1000 parts by volume of HF, from 0 to 300 parts by volume of HCl, and from 0 to 300 parts by volume of 1,1-di-fluoroethane, to a temperature between 500 and 700° C. under a pressure of 500 to 800 mm. Hg for a period comprised between 1 to 50 seconds.

3. A process for the preparation of vinyl fluoride which comprises reacting under approximately atmospheric pressure from 1 to 200 N liters of gaseous vinyl chloride per hour, for each liter of a liquid mixture at a temperature between −15 and +30° C. containing from 50 to 100% by weight of anhydrous HF, the balance consisting of at least one acidic compound selected from the group consisting of sulfuric acid, oleum, sulfuric anhydride, fluorosulfonic acid, alkaline metal bisulfate and perchloric acid to yield a gaseous mixture consisting of hydrogen fluoride, vinyl chloride, 1-chloro-1-fluoroethane and 1,1-difluoroethane and hydrogen chloride, containing per 100 parts by volume of vinyl chloride, from 5 to 500 parts by volume of 1-chloro-1-fluoroethane, from 20 to 1000 parts by volume of HF, from 0 to 300 parts by volume of HCl, and from 0 to 300 parts by volume of 1,1-di-fluoroethane; heating said gaseous mixture to a temperature between 500 and 700° C. at a pressure from 500 to 800 mm. Hg for a period between 1 to 50 seconds.

4. A process for the preparation of vinyl fluoride which comprises reacting under atmospheric pressure from 5 to 100 N liters of gaseous vinyl chloride per hour, for each liter of a liquid mixture at a temperature between 0° to 15° C. containing from 60 to 90% by weight of anhydrous HF, the balance consisting of at least one acidic compound selected from the group consisting of sulfuric acid, oleum, sulfuric anhydride, fluorosulfonic acid, alkaline metal bisulfate and perchloric acid to yield a gaseous mixture consisting of hydrogen fluoride, vinyl chloride, 1-chloro-1-fluoroethane and 1,1-difluoroethane and hydrogen chloride, containing per 100 parts by volume of vinyl chloride, from 5 to 500 parts by volume of 1-chloro-1-fluoroethane, from 20 to 1000 parts by volume of HF, from 0 to 300 parts by volume of HCl, and from 0 to 300 parts by volume of 1,1-di-fluoroethane; heating said gaseous mixture to a temperature between 500 and 700° C. at a pressure from 500 to 800 mm. Hg for a period between 2 to 30 seconds.

5. A process for preparing vinyl fluoride which comprises introducing a flow of gaseous vinyl chloride into a liquid acidic phase containing 50 to 100% anhydrous hydrogen fluoride at a temperature from −15° to +30° C., passing the reaction products into a pyrolysis chamber at a temperature from 400° C. to 800° C and at about atmospheric pressure, thereafter continuously distilling the products of the reaction chamber recycling the tails to the liquid acidic hydrogen fluoride containing phase, and separating vinyl fluoride from the heads consisting of vinyl fluoride and hydrogen chloride.

References Cited

UNITED STATES PATENTS

| | | | |
|---|---|---|---|
| 2,462,359 | 2/1949 | Calfee et al. | 260—653.4 |
| 3,200,160 | 8/1965 | Sianesi et al. | 260—653.5 |

DANIEL D. HORWITZ, *Primary Examiner.*